May 27, 1941.  V. H. VAN SANT  2,243,515
BOLT AND NUT LOCK
Filed Jan. 16, 1941
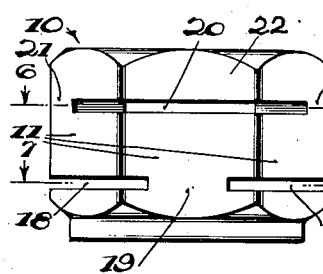
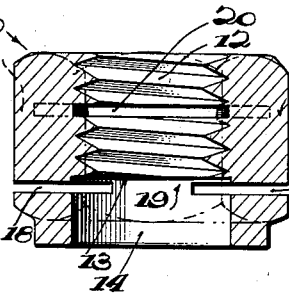
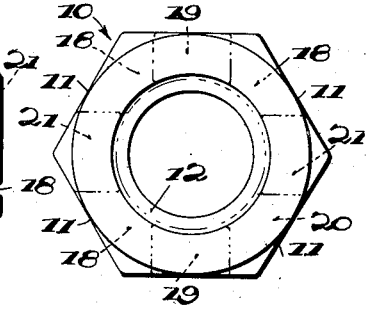
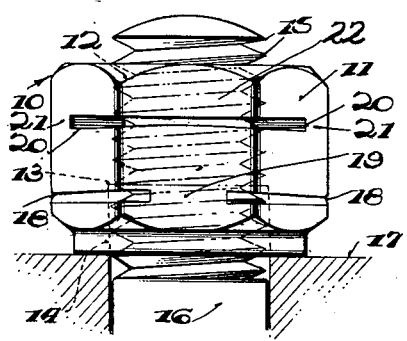
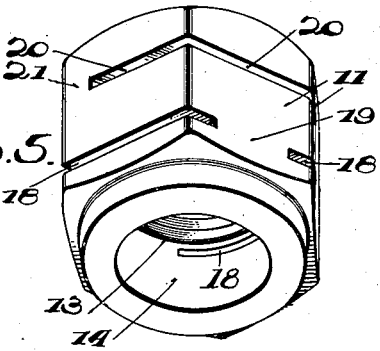
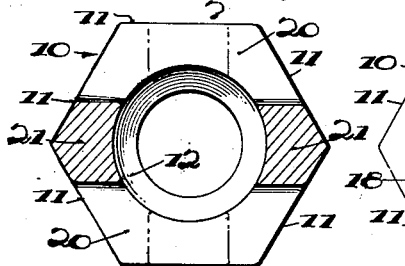
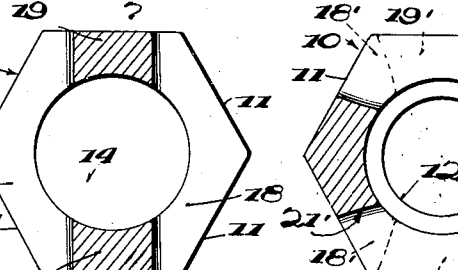
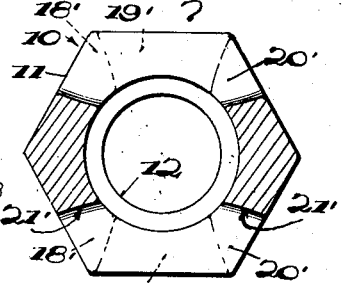
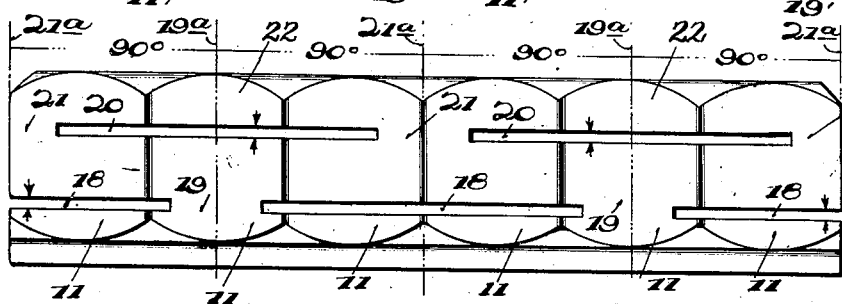
Inventor
Victor H. Van Sant.
By
Attorney Patented May 27, 1941

2,243,515

UNITED STATES PATENT OFFICE 2,243,515

BOLT AND NUT LOCK

Victor H. Van Sant, Westfield, N. J., assignor to Multigrip Safety Nut, Inc., Belleville, N. J., a corporation of New Jersey Application January 16, 1941, Serial No. 374,752

4 Claims. (Cl. 151—21)

My invention relates to bolt and nut locks.

An important object of my invention is to provide a highly simplified bolt and nut lock which may be manufactured quickly and cheaply.

A further object of the invention is to provide the nut with slots or cut out portions, arranged in such a manner that portions of the nut are distorted when the nut is screwed up against the work whereby the nut is placed under yielding tension to prevent unscrewing of the nut.

A further object of the invention is to provide a nut and bolt lock of the above-mentioned character wherein the nut in the normal condition before being placed upon the bolt is not distorted whereby it may be screwed upon the bolt up to the work by the fingers, the distortion of the nut subsequently occurring by the use of a wrench or tool.

Other objects and advantages of the invention will be apparent during the course of the following description.

In the accompanying drawing forming a part of this application and in which like numerals are employed to designate like parts throughout the same, Figure 1 is a side elevation of a nut embodying my invention, Figure 2 is a central vertical section through the same, Figure 3 is an end elevation of the nut, Figure 4 is a side elevation of the nut applied to a bolt and screwed up against the work so that it is distorted, Figure 5 is a perspective view of the nut removed, Figure 6 is a horizontal section taken on line 6—6 of Figure 1, Figure 7 is a horizontal section taken on line 7—7 of Figure 1, Figure 8 is a diagrammatic view showing the faces of the nut with the slots, and, Figure 9 is a view similar to Figure 7, showing a slightly modified form of nut.

In the drawing, wherein for the purpose of illustration is shown a preferred embodiment of my invention, the numeral 10 designates a nut having six flat faces 11. The nut is provided with a screw-threaded bore 12, extending through its outer end and extending to and terminating at a shoulder 13, of a cylindrical smooth bore 14, which extends through the inner end of the nut. The bore 14 has a diameter slightly larger than the diameter of the grooves of the threads 12 so that the wall of the bore 14 will clear the screw threads 15 of the bolt 16. The smooth bore 14 is disposed inwardly of the screw-threaded bore 12. The words "inner" and "outer" as applied to the nut refer to the inner and outer portions of the nut with respect to the face of the work or object which the nut engages when screwed up. The bolt is provided at its opposite end with the usual head, not shown, and the bolt extends through an opening in the work 17.

The nut 10 is provided with a pair of inner diametrically oppositely arranged circumferentially extending slots 18 which are cut in the nut. Each of these slots extends throughout the major portion of one half of the circumference of the nut. Each slot 18 extends throughout two of the faces 11 and throughout a minor portion of the adjacent face 11. The pairs of opposed slots 18 form between them vertical webs 19. The slots 18 pass through the inner wall of the smooth bore 14 and do not pass through the screw threads. The bore 14 is free from screw-threads throughout its entire length from the inner slots 18 to the inner end of the bolt. Formed in the outer portion of the nut is a pair of oppositely arranged circumferentially extending slots or openings 20. Each slot 20 extends throughout the major portion of one-half of the circumference of the nut. Each slot 20 extends throughout one face 11 and throughout the major portions of the adjacent faces 11. The opposed slots 20 form vertical webs 21. The slots 20 are cut through the threads 12. The slots 20 are spaced outwardly from the slots 18 and overlap with the same and are disposed in staggered relation thereto. The sets of slots 18 and 20 divide the nut into an inner portion, an intermediate portion, and an outer portion. The slots 18 and 20 are so arranged that the central longitudinal axis 19ª of the web 19 is disposed 90° from the central longitudinal axis 21ª of the next web 21.

Figure 9 shows slots 18' corresponding to the slots 18 and slots 20' corresponding to the slots 20. The slots 18' and 20' are cut by a circular tool and hence have curved edges 21'.

The operation of the bolt and nut is as follows:

The bolt 16 is passed through the opening in the work in the usual manner and its screw-threaded end 15 extends outwardly beyond the work. The nut before being applied to the bolt is not distorted and the side walls of the slots 18 and 20 are parallel. This enables the nut to be placed upon the bolt and screwed up thereon by the fingers until it engages the work. To effect the locking action of the nut with the bolt, the nut is now further turned or screwed up by means of a wrench. This brings the inner end of the nut into clamping engagement with the work and the webs 19 resist inward movement, as indicated by the arrows, Figure 8. The portions 22, opposite the webs 19, tend to move inwardly with respect to the webs 19 until the intermediate portions of the slots 20 are closed in whole or in part. The webs 21 move inwardly with respect to the slots 18 until the intermediate portions of these slots are closed in whole or in part. The web 19 exerts an outward force upon the intermediate section of the nut while the portion 22 is free to move inwardly upon the nut. The webs 21 move inwardly upon the nut while the oppositely arranged portions of the inner section of the nut are held against inward movement by engaging the work. The intermediate portion of the nut is therefore subjected to an outward force at the webs 19 and an inward force at the webs 21, whereby the slots 18 and 20 are closed in whole or in part, and the intermediate portion of the nut is twisted or distorted whereby its threads have locking engagement with the threads of the bolt. The plain bore 14 permits the continued screwing up of the nut after the inner end of the nut engages the work, so that the intermediate portions of the slots can close, in whole or in part.

It is preferred that the nut be made out of steel and after the slots are cut therein, the nut is preferably spring tempered. However, the nut may be formed of any other suitable material and the spring tempering may be omitted, if desired. While the nut is shown as hexagonal the invention is not restricted to this arrangement as the number of faces may be varied and the slots correspondingly varied. Further, the nut may have its periphery cylindrical thus dispensing with the faces. If the nut is spring tempered, it can be unscrewed from the bolt after the locking engagement therewith and may be used again, but if it is not spring tempered, it would be permanently distorted and could not be used again.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having thus described my invention, what I claim is:

1. In a bolt and nut lock, a bolt having a screw-threaded portion, a nut having a screw-threaded bore for engaging the screw-threaded portion of the bolt and a plain bore free from screw-threaded engagement with such screw-threaded portion, said nut having inner circumferentially extending spaced elongated openings which cut through the plain bore and through the exterior of the nut, said nut also having outer circumferentially extending spaced slots which cut through the screw-threaded bore, the outer slots being spaced from the inner elongated openings and arranged in overlapping relation thereto.

2. In a bolt and nut lock, a bolt having a screw-threaded portion, a nut having a screw-threaded bore for engaging the screw-threaded portion of the bolt and a plain bore free from screw-threaded engagement with such screw-threaded portion, said nut having inner circumferentially extending spaced slots which cut through the plain bore, said nut also having outer circumferentially extending spaced slots which cut through the screw-threaded bore, the inner slots being disposed in overlapping staggered relation with respect to the outer slots, the inner slots forming webs between them which are disposed between the ends of the outer slots.

3. In a bolt and nut lock, a bolt having a screw-threaded portion, a nut having a screw-threaded bore for engaging the screw-threaded portion of the bolt and a plain bore free from screw-threaded engagement with such screw-threaded portion, said nut having inner circumferentially extending equidistantly spaced slots which cut through the plain bore, said nut also having outer circumferentially extending equidistantly spaced slots which cut through the screw-threaded bore, each outer slot being spaced from the adjacent inner slots and overlapping the inner slots for substantially equal distances, the inner slots forming webs between them which are equidistantly spaced from the ends of the outer slot and the outer slots forming webs between them which are equidistantly spaced from the ends of the inner slots.

4. In a bolt and nut lock, a bolt having a screw-threaded portion, a nut having a screw-threaded bore for engaging the screw-threaded portion and a plain bore disposed inwardly of the screw-threaded bore and extending to and through the inner end of the nut and free from screw-threaded engagement with the screw-threaded portion of the bolt, said nut having inner circumferentially extending spaced slots which are cut through the plain bore, the plain bore being free from screw-threads throughout its entire length from the inner slots to its inner end, said nut also having outer circumferentially extending spaced slots which are cut through the screw-threaded bore, the sets of inner and outer slots being spaced longitudinally of the axis of rotation of the nut to divide the nut into inner, intermediate, and outer portions, each outer slot overlapping the inner slots, the inner slots forming webs between them which are spaced from the ends of the outer slots and the outer slots forming webs between them which are spaced from the ends of the inner slots, the arrangement being such that the webs between the inner slots and the webs between the outer slots produce a distortion of the intermediate portion of the nut outwardly and inwardly at spaced intervals whereby the threads of the inner portion have locking engagement with the threads of the bolt.

VICTOR H. VAN SANT.